United States Patent [19]

Tallent et al.

[11] 4,062,041
[45] Dec. 6, 1977

[54] INPUT VOLTAGE CONTROLLED OSCILLATOR CIRCUIT FOR A TELEVISION SIGNAL TIME BASE CORRECTOR

[75] Inventors: Michael W. Tallent, San Jose; Lee E. Scaggs, Mountain View; Allan L. Swain, Palo Alto; Ronnie M. Harrison; William B. Hendershot, III, both of San Jose, all of Calif.

[73] Assignee: Consolidated Video Systems, Inc., Santa Clara, Calif.

[21] Appl. No.: 540,025

[22] Filed: Jan. 10, 1975

Related U.S. Application Data

[62] Division of Ser. No. 381,463, July 27, 1973, Pat. No. 3,860,952.

[51] Int. Cl.² .......................... H04N 5/76; H04N 9/46
[52] U.S. Cl. .......................................... 358/8; 358/19
[58] Field of Search .................... 178/69, 5 CB; 358/8, 358/19; 331/20

[56] References Cited

U.S. PATENT DOCUMENTS

| | | | |
|---|---|---|---|
| 3,528,026 | 9/1970 | Groenoycke | 178/69.5 CB |
| 3,578,902 | 5/1971 | Monsay | 358/8 |
| 3,590,144 | 6/1971 | Bruch | 178/69.5 CB |
| 3,820,154 | 6/1974 | Faroudja et al. | 358/8 |

Primary Examiner—John C. Martin
Attorney, Agent, or Firm—Townsend and Townsend

[57] ABSTRACT

An input voltage controlled oscillator circuit for a digital video time base corrector used to process television signals to remove time base errors introduced during signal recording, reproducing, or transmission. In the time base corrector, incoming video signals are converted from analog-to-digital form, temporarily stored in a memory unit at a clocking rate which varies in a manner generally proportional to the time base errors, and the stored signals are fetched at a standard clocking rate.

The input voltage controlled oscillator circuit generates the clock signals for performing the analog-to-digital conversion and for storing the digital signals in the memory unit. The frequency of the clock signals varies in accordance with the time base errors in the composite sync and burst portions of the incoming video signals.

The VCO circuit includes an oscillator for generating an integral multiple of the clock signal train, a first phase lock loop controlled by the frequency of successive composite sync pulses in the incoming video signal, a second phase lock loop controlled by the colorburst portion of successive lines of video information, a gated integrator coupled to the second phase lock loop for integrating successive ones of the VCO control signals generated by the second phase lock loop over a plurality of successive lines of video, and means for enabling the gated integrator during the colorburst portion of successive lines of video.

The VCO circuit further includes means for disabling the gating means and the gated integrator when one of the colorburst portions of the video signals lies below a predetermined threshold.

3 Claims, 1 Drawing Figure

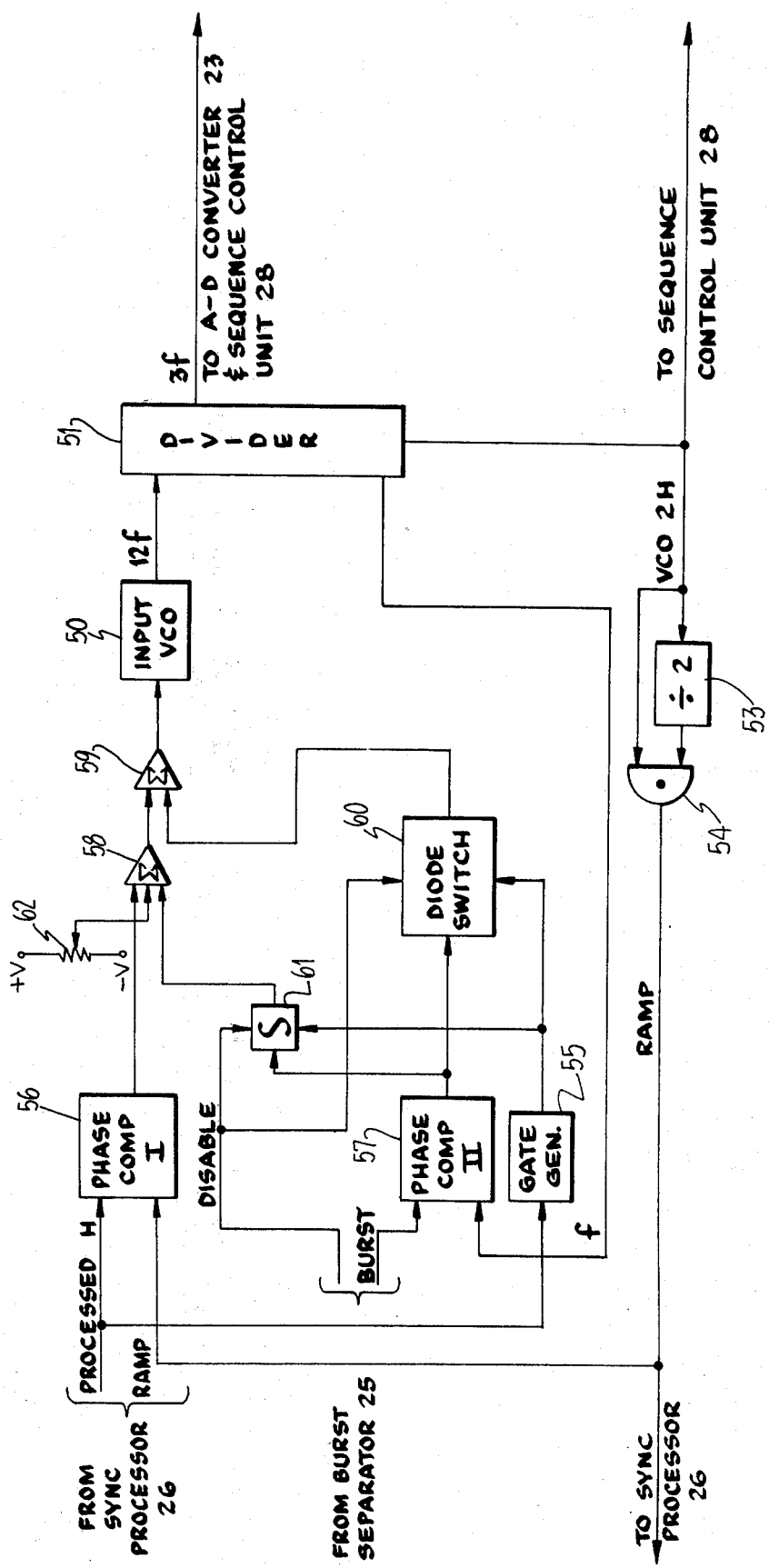

INPUT VOLTAGE CONTROLLED OSCILLATOR CIRCUIT FOR A TELEVISION SIGNAL TIME BASE CORRECTOR

This is a divisional of application Ser. No. 381,463 filed July 27, 1973 for "Television Signal Time Base Corrector", now U.S. Pat. No 3,860,952, the disclosure of which is hereby incorporated by reference.

SUMMARY OF THE INVENTION

The invention comprises an input voltage controlled oscillator circuit for a digital video time base corrector used to process video signals to remove time base errors, the corrector including a memory unit with a plurality of memory portions each capable of storing a plurality of horizontal lines of video information. In the most general aspect, the input voltage controlled oscillator circuit has a first phase lock loop controlled by the frequency of successive sync pulses in the incoming video signal, and a second phase lock loop controlled by the colorburst frequency of the burst portion of successive lines of video information. Frequency deviations in the incoming signals are converted to error voltages, which are summed and used to control the frequency of the voltage controlled oscillator, the latter being used to generate the clock signals for digitizing and storing the input video signals in the memory unit.

In the preferred embodiment, the invention includes an oscillator having a control signal input for generating a reference signal train having a frequency dependent upon a control signal present at the control signal input; means coupled to the oscillator for generating a sync reference signal; a first phase comparator means having a first input coupled to the sync reference signal and a second input adapted to be coupled to the sync portions of the video type signals; means for comparing the phase difference between the sync reference signal and successive ones of the sync portions of the video type signals; means for generating a first control signal having a magnitude dependent upon the phase difference; means coupled to the oscillator for generating a colorburst frequency reference signal; a second phase comparator means having a first input coupled to the colorburst frequency reference signal and a second input adapted to be coupled to the colorburst portions of the video type signal; means for comparing the phase difference between the colorburst frequency reference signal and successive ones of the colorburst portions of the video type signals; means for generating a second control signal having a magnitude dependent upon the phase difference; means for coupling the first and second control signals to the control signal input of the oscillator, whereby the reference signal train frequency varies in accordance with the magnitude of the first and second control signals to minimize the first and second phase differences; gated integrator means coupled to the second phase comparator means for integrating successive ones of the second control signals over a plurality of successive lines of the video type signals; and means for enabling the gated integrator means during the colorburst portion of successive lines of the video type signals. The invention further includes means for temporarily disabling the gating means and the gated integrator means when one of the colorburst portions of the video type signals lies below a predetermined threshold.

For a fuller understanding of the nature and advantages of the invention, reference should be had to the following detailed description taken in conjunction with the accompanying drawings.

BRIEF DESCRIPTION OF THE DRAWINGS

The FIGURE is a schematic diagram illustrating the preferred embodiment of the invention.

INPUT VCO CIRCUIT

The FIGURE illustrates input VCO circuit 27 which generates $3f$ sample and store signals at a frequency which compensates for the time base errors in processed H and input color burst. A voltage controlled oscillator 50 generates a high frequency periodic signal train at a multiple of $f_c$ the standard color burst frequency (3.58 MHZ). In the preferred embodiment, the frequency of this signal train is $12f_c$. The output of voltage controlled oscillator 50 is coupled to the input of a conventional divider circuit 51 which in the preferred embodiment comprises three 74161 type counters coupled in tandem. Divider 51 is tapped at a plurality of outputs to generate a variety of reference signals. The first output, labeled $3f$, provides the sample signals for analog-to-digital converter 23 and the write clock signals for sequence control unit 28. Another output, labeled $f$, provides a high frequency reference signal to a first input of a phase comparator 57 for a purpose to be described. The remaining output, labeled VCO 2H, is coupled directly to a first input of an AND gate 54 and through a conventional divide-by-2 circuit 53 to the other input of AND gate 54. The output of AND gate 54, termed RAMP, is coupled to an input of a phase comparator 56 and also to AND gate 41 of sync processor 26 (FIG. 3).

Incoming processed H signals are coupled to the input of a gate generator 55. Gate generator 55 provides a gating signal for a diode switch 60 and an integrator 61. In the preferred embodiment, gate generator 55 comprises a monostable multivibrator having a period substantially equal to the duration of the color burst portion of a line of video information, i.e. approximately 2.3 microseconds.

As noted above, RAMP signal is coupled to a first input of phase comparator 56. The remaining input to phase comparator 56 is processed H from the output of sync processor 26. Phase comparator 56 is a conventional phase comparator circuit which provides a DC correction voltage whose magnitude varies with the phase difference between the two input signals. In addition, phase comparator 56 is provided with an internal sample and hold circuit which retains the correction voltage between successive phase comparisons (i.e. in the period between successively received processed H pulses). The output of phase comparator 56 is coupled to a first input of a summing amplifier 58, the output of which is coupled to a second summing amplifier 59.

As noted above, $f$ signal is coupled to a first input of phase comparator 57. The remaining input to phase comparator 57 comprises the input video color burst signal received from burst separator 25. Phase comparator 57 is similar to phase comparator 56 and provides a DC correction voltage whose magnitude varies in accordance with the phase difference between the two input signals. In addition, phase comparator 57 is also provided with an internal sample and hold circuit for retaining this control voltage between successive phase comparisons. The output of phase comparator 57 is coupled to a diode switch 60 and also to an integrator 61.

Diode switch 60 is preferably a four diode bridge with a switching input which is controlled by the gate signal obtained from gate generator 55 so that the output of phase comparator 57 is coupled to the second input of summing amplifier 59 only during the burst portion of a line of video information.

Integrator 61 is a conventional gated integrator having a gate input controlled in a manner similar to diode switch 60 by the gate signal obtained from gate generator 55 so that the output of phase comparator 57 is coupled to integrator 61 also only during the color burst portion of successive lines of video information. The output of integrator 61 is coupled to a second input of summing amplifier 58. Both diode bridge 60 and integrator 61 are provided with disable inputs controlled by the disable signal obtained from the above-noted threshold circuitry of burst separator 25 which disables diode switch 60 and integrator 61 whenever the color portion of the incoming video information lies below a predetermined threshold level.

A calibrating potentiometer 62 is coupled to a pair of reference voltages $+V$, $-V$, respectively, and to a third input to summing amplifier 58 as shown.

In operation, in the absence of any time base error in the incoming video signal voltage controlled oscillator 50 generates a $12 f_c$ signal train. The $12 f_c$ signal train is divided down by divider 51 to produce the $3 f_c$ (i.e. 10.7 MHZ) sample and store signals, $f$ phase reference signals at the rate of 3.58 MHZ to phase comparator 57 and VCO 2H reference signals at the rate of 31.47 KHZ. The VCO 2H reference signals are processed by divide-by-2 circuit 53 and AND gate 54 to produce the RAMP signal which comprises a 15 microseconds wide square wave train centered about the expected arrival time of successive horizontal sync pulses. Calibration of the input VCO unit is achieved empirically by injecting a standard video test pattern into the system and adjusting potentiometer 62 while observing the video output of the unit on a suitable test instrument (e.g. an oscilloscope) until the horizontal sync portion of the video output appears in standard form. Once adjusted, the properly phased RAMP signal serves as a reference input to phase comparator 56. In the absence of any time base errors in the incoming video signal, neither phase comparator 56 nor phase comparator 57 produces a correction voltage, and voltage controlled oscillator 50 continues to generate the signal train at $12 f_c$.

If the incoming video signal contains time base errors, the phase difference between processed H and RAMP signals causes phase comparator 56 to produce a first correction voltage which is coupled by summing amplifiers 58 and 59 to the control voltage input of voltage controlled oscillator 50. In addition, any phase difference between the color burst input signal and the $f$ reference from divider 51 causes phase comparator 57 to produce a correction voltage at the output thereof which is coupled during the burst portion of that horizontal line to integrator 61 and through diode switch 60 to voltage controlled oscillator 50 via summing amplifier 59. It will be remembered that the operation of diode switch 60 and integrator 61 is controlled both by the gate signal from gate generator 55 and the disable signal from burst separator 25. Thus, if the color portion of the input video signal lies below a predetermined threshold, or if there is no color component (i.e., the input video signal is monochromatic), the disable signal applied to diode switch 60 and integrator 61 disables these elements. In the absence of a disable signal, the correction voltage resulting from phase differences in the color portion of the signal is coupled directly to the control voltage input of voltage controlled oscillator 50 and is also over a period of several lines by integrator 61.

Receipt of the control voltage by voltage controlled oscillator 50 causes the frequency of the output to shift from $12 f_c$ to a different frequency in order to compensate for the detected phase differences. This change in frequency of the output of voltage controlled oscillator 50 is reflected in the various output signals from divider 51.

As will now be apparent, input VCO circuit 27 provides two phase correction loops for adjusting the frequency of input VCO 50. The first, or H, loop provides a coarse correction voltage which compensates for large time base errors. The second, or $f$, loop provides a fine correction voltage which compensates for small time base errors. In addition, the $f$ loop integrator 61 provides a time averaged correction voltage, averaged over several lines of video, which compensates for random 180° color phase lock errors.

While the above provides a full and complete disclosure of the preferred embodiment various modifications, alternate constructions and equivalents may be employed without departing from the true spirit and scope of the invention. Therefore, the above description and illustrations should not be construed as limiting the scope of the invention, which is defined by the appended claims.

What is claimed is:

1. An oscillator circuit for generating reference signals having a frequency corrected in accordance with time base errors in video type signals, said circuit comprising:

an oscillator having a control signal input for generating a reference signal train having a frequency dependent upon a control signal present at said control signal input;

means coupled to said oscillator for generating a sync reference signal;

a first phase comparator means having a first input coupled to said sync reference signal and a second input adapted to be coupled to the sync portion of said video type signals, said first phase comparator means including means for detecting a first phase difference between said sync reference signal and successive ones of said sync portions of said video type signals, and means for generating a first control signal having a magnitude dependent upon said first phase difference;

means coupled to said oscillator for generating a color burst frequency reference signal;

a second phase comparator means having a first input coupled to said color burst frequency reference signal and a second input adapted to be coupled to the color burst portions of said video type signal, said second phase comparator means including means for detecting a second phase difference between said color burst frequency reference signal and successive ones of said color burst portions of said video type signals and means for generating a second control signal having a magnitude dependent upon said second phase difference;

means for coupling said first and second control signals to said control signal input of said oscillator, whereby said reference signal train frequency varies in accordance with the magnitude of said first and second control signals to minimize said first and second phase differences;

said coupling means including gating means for transmitting said second control signal to said control signal input, and means for enabling said gating means during the color burst portion of successive lines of said video type signals;

gated integrator means coupled to said second phase comparator means for integrating successive ones of said second control signals over a plurality of successive lines of said video type signals; and means for enabling said gated integrator means during the color burst portion of successive lines of said video type signals.

2. The system of claim 1 wherein said oscillator is a voltage controlled oscillator having a center frequency $(K/L)f_c'$ where $f_c$ is the color burst frequency standard and K and L are integers.

3. The system of claim 1 further including means for temporarily disabling said gating means and said gated integrator means when one of said color burst portions of said video type signals lies below a predetermined threshold.

* * * * *